Figure 1:
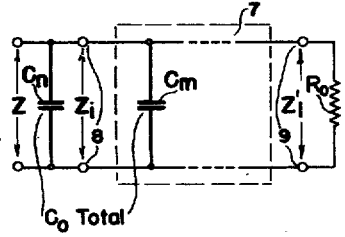

July 25, 1939.   H. A. WHEELER   2,167,134
WIDE BAND COUPLING SYSTEM
Filed April 22, 1938    5 Sheets-Sheet 1

INVENTOR
HAROLD A. WHEELER
BY Laurence B Dodds
ATTORNEY

July 25, 1939.   H. A. WHEELER   2,167,134
WIDE BAND COUPLING SYSTEM
Filed April 22, 1938   5 Sheets-Sheet 2

INVENTOR
HAROLD A. WHEELER
BY Laurence B Dodds
ATTORNEY

INVENTOR
HAROLD A. WHEELER
BY
ATTORNEY

July 25, 1939.   H. A. WHEELER   2,167,134
WIDE BAND COUPLING SYSTEM
Filed April 22, 1938   5 Sheets-Sheet 5

INVENTOR
HAROLD A. WHEELER
BY Laurence B. Dodds
ATTORNEY

Patented July 25, 1939

2,167,134

UNITED STATES PATENT OFFICE 2,167,134

WIDE BAND COUPLING SYSTEM

Harold A. Wheeler, Great Neck, N. Y., assignor to Hazeltine Corporation, a corporation of Delaware Application April 22, 1938, Serial No. 203,595

17 Claims. (Cl. 178—44)

This invention relates generally to coupling systems and particularly to coupling systems including a pair of terminals between which there is substantial conductance and susceptance and between which it is desired to build up a high impedance or high admittance which is substantially constant over a wide range of frequencies. The invention is of particular utility in a network comprising one or more coupling systems coupled in cascade in which the impedance variation of one or more of the coupling systems varies in a manner complementary to that of another or others of the coupling systems over a wide range of frequencies, whereby a predetermined or substantially uniform over-all response is obtained.

In many coupling arrangements, it is desirable to build up a substantially uniform impedance having the largest possible mean value over a wide range of frequencies across terminals having conductance and susceptance in parallel therewith, or to maintain maximum admittance over the range between terminals having inductance and resistance in series therewith; that is, it is desirable to maintain approximately the limiting mean value of impedance, either maximum or minimum, between the terminals over the wide range of frequencies. For instance, in the design of vacuum-tube amplifiers to pass a wide range of frequencies, it is desirable to build up across a condenser, comprising the inherent capacitance of the tube circuits to be coupled, the maximum impedance that can be maintained substantially uniform over the operating frequency range of the amplifier. Such impedance characteristics are required of the coupling systems of the amplifier and the value of the impedance which can be maintained over a given frequency range is limited by the inherent capacitance and conductance of the tube circuits to be coupled. Prior art coupling arrangements designed for this purpose have only approximated the desired results and the effect of resistance inherent in such amplifier circuits has generally been neglected.

Also, it is frequently desirable to obtain from a composite network comprising several component coupling systems coupled in cascade, a response characteristic having a predetermined variation with frequency over a wide range of frequencies, while maintaining the maximum mean value of impedance or admittance across the component coupling systems. For example, in a wide band amplifier including, in two stages coupled in cascade, two tubes of widely different types, the inherent capacitance of the circuits of the two tubes may be greatly different. In this case it is relatively easy to build up the impedance in the circuit of less capacitance and relatively difficult in the circuit of more capacitance. Substantially uniform over-all response may be obtained by causing the impedance to increase towards the cutoff frequency in the circuit of less capacitance and to decrease in the same direction in the circuit of more capacitance. Coupling arrangements of the prior art have not used component coupling systems coupled in cascade in which the component coupling systems have complementary impedance variations and in which the maximum mean value of impedance or admittance is maintained in the component coupling systems over a wide frequency range. Also, the effect of substantial shunt conductance or series-resistance in such coupling circuits has not been compensated.

In coupling two consecutive tubes of unequal capacitance, it is sometimes advantageous to use a network which is not adapted for unequal capacitance and, therefore, has nonuniform response between unequal values of capacitance. Even if the two tubes have equal capacitance, the most convenient network may be one which gives nonuniform response between two tubes of equal capacitance. The prior art has not shown the combination of such arrangements in different stages which have complementary variations of responsiveness in order to permit the maximum freedom of design.

It is an object of the invention to provide a coupling system comprising reactance and resistance wherein a maximum mean value of impedance or admittance is maintained over a wide frequency range.

It is another object of the invention to provide a coupling system having maximum impedance over a wide frequency range for use between two successive tubes of a vacuum-tube amplifier.

It is still another object of the invention to provide a composite network including several coupling systems coupled in cascade and having different response characteristics in which the mean impedances of the coupling systems are maintained within predetermined limits and in which the over-all response of the composite network varies in a predetermined manner over the frequency range.

In accordance with one embodiment of the invention, a signal-translating system for operation over a range of frequencies comprising one or more pairs of terminals between one pair of which there is effectively substantial reactance and substantial resistance, both tending to limit the response of the system over its range. A dead-end filter is provided having an image impedance over the range coupled to one of the pairs of terminals, the filter comprising only a part of the reactance associated with the said pair of terminals as a terminal mid-element of the filter and an impedance termination coupled to the dead end of the filter proportioned substantially to match the image impedance of the filter over its range. The reactive constants of the dead-end filter are so proportioned relative to the reactance and resistance associated with the said pair of terminals and the operating frequency range that the impedance between the said pair of terminals over said range is substantially uniform and approximately the limiting value that can be maintained between the said terminals over the range. In one embodiment of the invention, a dead-end filter is utilized in each of two or more component coupling systems of a composite network to procure, in the component coupling systems, impedance characteristics or response characteristics which vary in a predetermined manner with respect to each other, preferably complementarily, over a wide range of frequencies, thereby to provide a predetermined over-all response characteristic.

In other embodiments of the invention, a dead-end filter is so proportioned and coupled to a terminal circuit of the coupling system that a substantially constant impedance is obtained, over a wide frequency range, across the terminal circuit, which may also comprise appreciable resistance effectively in parallel or in series.

Other modifications of the dead-end filter of the invention are described and claimed in applicant's applications Serial No. 203,596, Serial No. 203,597, and Serial No. 203,598, filed concurrently with the present application while a general circuit arrangement for maintaining uniform impedance across terminals comprising inductance associated therewith and tending to limit the response of the system over a wide range of frequencies is described and broadly claimed in applicant's copending application Serial No. 161,017, filed August 26, 1937, all assigned to the same assignee as the present application.

Figure 2:
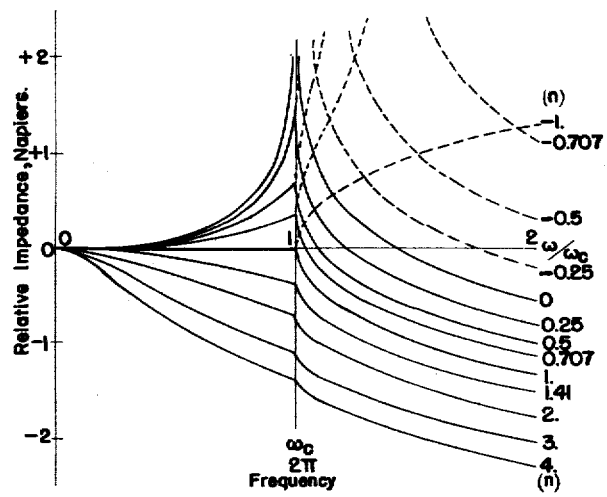
Figure 3:
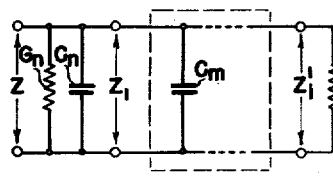
Figure 4:
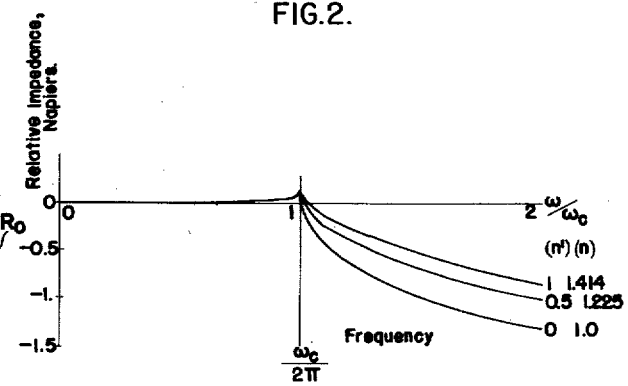
Figure 9:
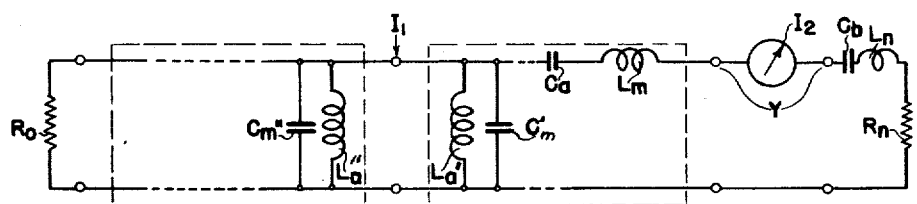
Figure 5A:
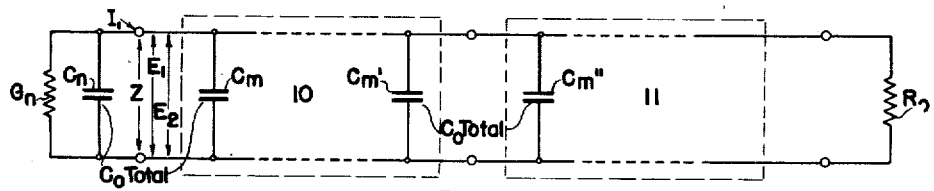
Figure 5B:
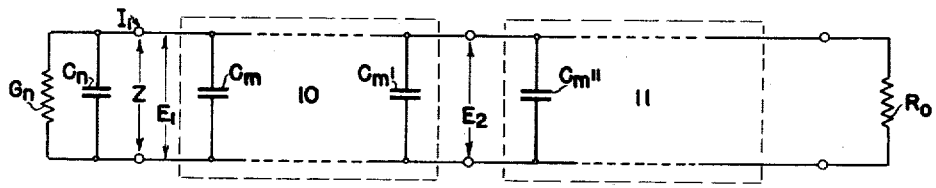
Figure 5C:
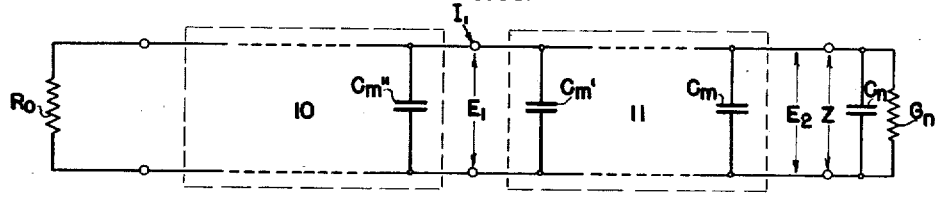
Figure 6A:
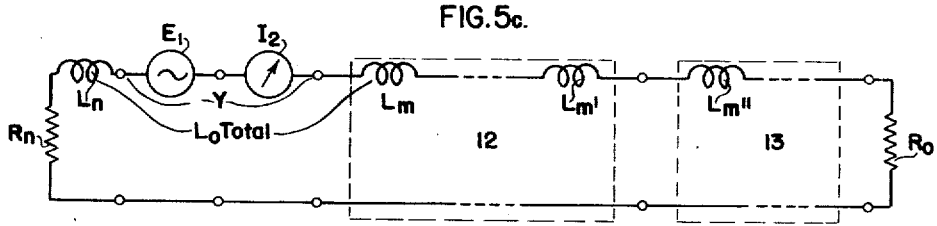
Figure 6B:
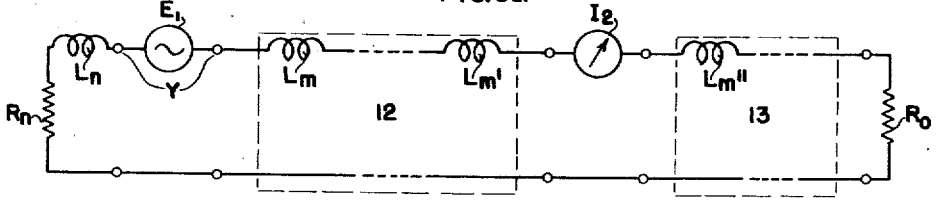
Figure 6C:
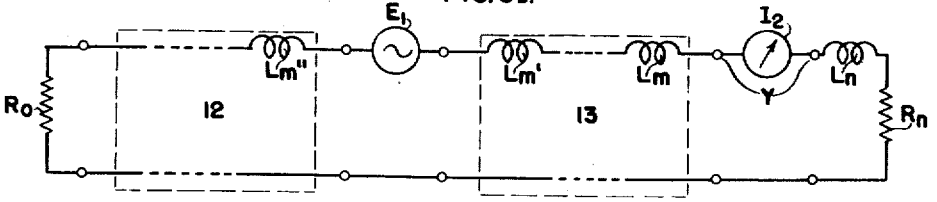
Figure 11:
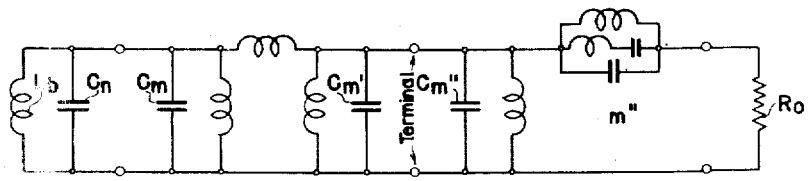
Figure 12:
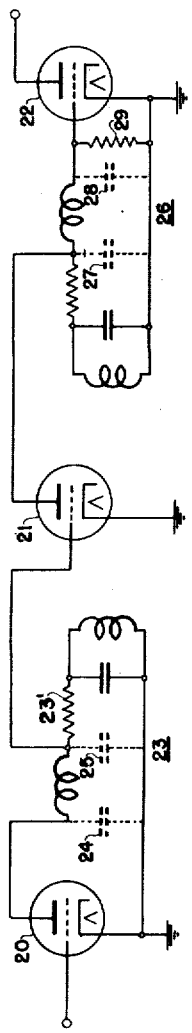
Figure 13:
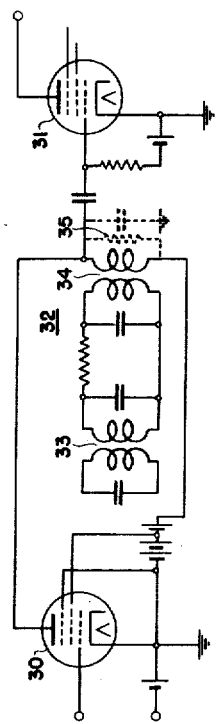
Figure 14:
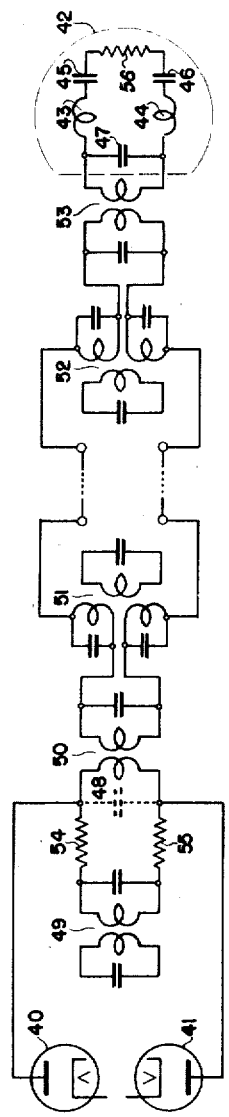

The novel features believed to be characteristic of the invention are set forth with particularity in the appended claims. The invention itself, however, both as to its organization and method of operation, together with further objects and advantages thereof, will best be understood by reference to the specification taken in connection with the accompanying drawings, in which Figs. 1 and 3 are simplified or equivalent circuit diagrams utilized to explain the general theory of the invention; Figs. 2 and 4 are graphs illustrating certain of the operating characteristics of the circuits of Figs. 1 and 3; Figs. 5a—5c, inclusive, are circuit diagrams utilized to explain the general theory of the invention with reference to a filter circuit comprising shunt capacitance across one or more sets of terminals; Figs. 6a—6c, inclusive, are circuit diagrams utilized to explain the general theory of the invention with reference to a filter circuit comprising inductance in series with one or more sets of terminals; Figs. 7a—8c, inclusive, are circuit diagrams utilized to explain the general theory of the invention with reference to a filter circuit in which the input and output circuits have reciprocal impedance properties; Fig. 9 is a circuit diagram utilized to explain the general theory of the invention with reference to a band-pass filter; Figs. 10a—10e, inclusive, are circuit diagrams of a number of practical four-terminal low-pass filter circuits in accordance with the invention; Fig. 11 is a circuit diagram of a four-terminal band-pass filter circuit in accordance with the invention; Fig. 12 is a circuit diagram illustrating a manner of coupling three vacuum tubes in successive stages of a vacuum-tube amplifier by means of filter circuits in accordance with the invention; Fig. 13 illustrates a band-pass coupling system comprising a filter circuit of the invention for coupling two vacuum-tube amplifiers; while Fig. 14 is a circuit diagram of filter circuits in accordance with the invention utilized to couple a push-pull power amplifier to an antenna circuit.

The principles of the theoretical relations underlying the invention are described most simply by reference to a nondissipative wave filter of the constant-$k$ type. This filter may be assumed to have an infinite number of sections or to be terminated with its image impedance to give the same effect. The input impedance of such a filter is uniform over the pass bands if the input termination is full-series or full-shunt as distinguished from the usual mid-series or mid-shunt termination. The input impedance is the iterative impedance measured in series with a full-series arm or in parallel with a full-shunt arm, as distinguished from the conventional image impedance measured at mid-series or mid-shunt. This input impedance may be regarded as a two-terminal coupling impedance, the remainder of the filter serving merely as a dead-end supplementary network utilized to secure the desired uniform impedance.

Any such filter of finite total band width can be arranged to include directly across its full-shunt arm, a capacitance of the value $$C = 2/R\Delta\omega \qquad (1)$$

in which $R$ is the mid-band image impedance and $\Delta\omega$ is $2\pi$ times the total width of the pass bands. The uniform full-shunt iterative impedance across the capacitance $C$ has the magnitude $$R = 2/C\Delta\omega \qquad (2)$$

This relationship expresses the theoretically maximum value of impedance that can be maintained across the capacitance $C$ throughout frequency bands of total width $\Delta\omega$. In the case of a simple low-pass filter, the value of $R$ is twice the reactance of the capacitance $C$ at the cutoff frequency.

The problem reciprocal to building up the impedance across a capacitance is building up the admittance through an inductance. A filter can be arranged to include directly in series with all the other elements of its series arm, an inductance of the value $$L = 2R'/\Delta\omega \qquad (3)$$

The uniform full-series iterative impedance through the inductance $L$ has the magnitude $$R' = L\Delta\omega/2 \qquad (4)$$

This relationship expresses the theoretically minimum value of impedance that can be maintained through an inductance $L$ over the frequency bands of total width $\Delta\omega$. In the case of a simple low-pass filter, this value is half the reactance of the inductance $L$ at the cutoff frequency. The specification will not be generalized to include the derivations of expressions relating to maintaining a given value of admittance through an inductance, because all the relations hereinafter given can be applied to this problem by the analogy which appears in the preceding formulae.

The image impedance of a filter of the type under discussion is purely resistive in the pass bands, though not uniform. On the other hand, the uniform iterative impedance has a substantial phase angle which is a lagging phase angle as to the impedance across a capacitance or the admittance through an inductance. The phase characteristic is that of a half-section of a constant-$k$ filter. A more general analysis is given hereinafter with reference to a simple low-pass filter, without any loss of generality in the foregoing concepts.

Referring now to the drawings, Fig. 1 shows the basic filter circuit in simplified form, the filter, per se, being represented schematically at 7 and having input terminals 8 and output terminals 9. The input termination $C_m$ of filter 7 is a mid-shunt element and the input image impedance $Z_i$ follows the constant-$k$ characteristic. The output termination of filter 7 is either mid-series or mid-shunt and its image impedance $Z_i'$ preferably follows an $m$-derived characteristic to match closely the output load resistance $R_o$. In developing the theoretical relations, this impedance matching is assumed to be exact in the pass bands, since any required degree of approximation is possible by means of multiple $m$-derivations.

For the sake of generality and clarity, the total capacitance $C_o$ across the input terminals 8 may have any value and is divided in two parts, $C_m$ comprising the mid-shunt capacitance termination of the filter, and $C_n$ the external added capacitance, thus, only a part of the total capacitance across terminals 8 is included in the filter as a mid-shunt element. The input impedance $Z$ is, therefore, across the total shunt capacitance, $C_o = C_m + C_n$. This impedance is to be built up with the aid of a dead-end filter acting merely as a passive auxiliary network.

The shunt capacitance $C_m$ in the filter is the mid-shunt element of a terminal half-section. This half-section may be of $m$-derived type ($m<1$) or of constant-$k$ type ($m=1$), since either type is available in a form whose mid-shunt termination presents the desired constant-$k$ image impedance $Z_i$ across shunt capacitance $C_m$. In such a half-section, the value of the mid-shunt capacitance is $$C_m = m/R_o\omega_c \quad (5)$$

in which $\omega_c$ is $2\pi f_c$, where $f_c$ is the cutoff frequency of the low-pass filter. The external shunt capacitance $C_n$ can have any value as determined by the choice of the parameter $n$ in the formula $$C_n = n/R_o\omega_c \quad (6)$$

Therefore, the total shunt capacitance is $$C_o = C_m + C_n = (m+n)/R_o\omega_c \quad (7)$$

The factor $(m+n)$ may have any positive value. One of the parts may be negative, since the parts do not have to exist separately. Negative $C_n$ merely means that the total capacitance $C_o$ is less than the mid-shunt capacitance $C_m$ of the filter. Equation (7) may also be written as $$\omega_c = (m+n)/C_oR_o \quad (8)$$

$$R_o = (m+n)/C_o\omega_c \quad (9)$$

$$R_oC_o\omega_c = m+n \quad (10)$$

The image impedance $Z_i$ depends only on $R_o$ and $\omega_c$, not on $C_m$ and $m$, because it always has the constant-$k$ characteristic:

$$Z_i = \frac{R_o}{\sqrt{1-(\omega/\omega_c)^2}} \quad (11)$$

The image impedance is resistive in the pass band, capacitive in the attenuation band, and infinite at the cutoff frequency. It is convenient to use the parameter $x = \omega/\omega_c$ to denote the relative frequency in subsequent expressions. The relative impedance of $C_n$ and $Z_i$ in parallel is $$\frac{Z}{R_o} = \frac{1}{R_o/Z_i + j\omega C_n R_o} = \frac{1}{\sqrt{1-x^2}+jxn} \quad (12)$$

This formula has a discontinuity at the cutoff frequency ($x=1$) where the $Z_i$ term of the denominator changes from real to imaginary. It is seen that the form of the impedance characteristic depends only on $$n = R_oC_n\omega_c \quad (13)$$

from Equation (6), and does not depend on $$m = R_oC_m\omega_c \quad (14)$$

from Equation (5).

In the pass band ($x<1$), $Z/R_o$ is complex and its magnitude is $$\left|\frac{Z}{R_o}\right| = \frac{1}{\sqrt{1+x^2(n^2-1)}} \quad (15)$$

if $n=1$, this is constant (unity). For greater values of $n$, it has the form of a simple resistor and capacitor in parallel, though the phase angle is not the same. The impedance has a lagging phase angle $$b = \tan^{-1}\frac{nx}{\sqrt{1-x^2}} \quad (16)$$

This is the same as the formula for a half-section $m$-type filter except that the $m$ of the filter is replaced by the parameter $n$ which determines the relative value of $C_n$. If $n=1$, it simplifies to $$b = \sin^{-1}x \quad (17)$$

In the attenuation band ($x>1$), $Z/R_o$ is imaginary and its magnitude is $$\left|\frac{Z}{R_o}\right| = \frac{1}{\sqrt{x^2-1}+xn} \quad (18)$$

It has a lagging phase angle, $b=\pi/2$. These characteristics cannot be realized exactly because the output image impedance $Z_i'$ cannot match $R_o$ outside the pass band. As the attenuation increases, this failure has less effect on the input impedance. Therefore, any degree of approximation to the theoretical characteristics outside the pass band can be realized with a sufficient number of sections designed to secure adequate attenuation.

Fig. 2 shows the theoretical impedance characteristics for various values of the parameter $n$ between $-1$ and $+4$. It is noted that the values $+1$ yield uniform impedance in the pass band. If the filter has a constant-$k$ whole section on the input side, so that $m=1$ the values $+1$ and $-1$ for $n$ correspond, respectively, to full-shunt and full-series termination. In the former case, the addition of $C_n$ doubles the mid-shunt element, while in the latter case it cancels the mid-shunt element. The sign of the parameter $n$ does not affect the magnitude of the impedance in the pass band, but it does determine the sign of the phase angle.

Since only positive self-reactance elements can be realized in a passive network, the value of $m$ in the end half-section of a filter must be between 0 and $+1$. Since $m+n$ must be positive, the value of $n$ must be between $-1$ and $+\infty$. Negative values of $n$ make the impedance infinite at the frequency $$x = \frac{1}{\sqrt{1-n^2}} \quad (19)$$

At higher frequencies, the phase angle is reversed in sign, $b = -\pi/2$.

Any of the impedance characteristics of Fig. 2 are theoretically obtainable across a maximum value of total shunt capacitance if $m=1$, $n$ having the value identified with the characteristic curve. If $m$ is less than one, the total capacitance directly across the input terminals is less by the amount added indirectly across the input terminals through the other arms of the filter. Therefore, a uniform impedance equal to $R_o$ in the pass band is obtainable across a maximum total capacitance, directly and indirectly in shunt, whose value is computed by letting $m=n=1$:

$$C_e = 2/R_o\omega_e \quad (20)$$

which corresponds to Equation (1). Any change of the total capacitance, by changing the value of $n$, causes an inverse change of the average impedance in the pass band, although its value $R_o$ at zero frequency remains the same.

In the pass band, the impedance near the cutoff frequency is determined mainly by the value of $n$, that is, by the external shunt capacitance $C_n$. The image impedance $Z_i$ having less effect, the tolerance of mismatching between $Z_i'$ and $R_o$ at the far end of the filter becomes greater. Also, this tolerance increases with $n$. The number of sections in the filter affects the number of peaks and valleys in the actual impedance curve of $Z$, while the phase characteristics affect their spacing along the frequency axis.

The general concepts utilized above to develop the expressions relating to low-pass filters are generally valid for filters having any number of pass bands. The mid-shunt capacitance $C_m$ may be supplemented by parallel branches to form an impedance network of the form required in a constant-$k$ shunt arm to give the required pass bands. $C_n$ also may be supplemented and in this case the inside and outside shunt arms can still be merged into one. The generalized relation corresponding to Equation (10) is $$R_o C_o \Delta\omega = m + n \quad (21)$$

in which $\Delta\omega$ is the total width of the pass bands. Uniform impedance of magnitude $R_o$ is secured in all pass bands if $n=1$. It is secured with maximum shunt capacitance if also $m=1$. This expression, for any example of uniform impedance, may be designated as the "figure of merit" of the particular network, its maximum value being two.

In the derivation of the above ideal relations, the only dissipation considered is that of the terminal resistor $R_o$ across the dead end of the filter. Dissipation in the filter has the effect of smoothing out the impedance curve and rounding the discontinuity at the cutoff frequency, which is not very detrimental in moderation. Another source of dissipation is shunt conductance across the input terminals, that is, across the desired impedance $Z$. This may exist in substantial amount and is detrimental because it limits the impedance that can be built up across a given shunt capacitance over a given frequency band.

Fig. 3 represents a low-pass network of the type of Fig. 1, but having conductance $G_n$ added directly in shunt to the impedance $Z$. Its value relative to the terminating shunt conductance $G_o = 1/R_o$ defines the parameter $n'$:

$$G_n = n' G_o \quad (22)$$

The total shunt capacitance also may be expressed in terms of $G_o$:

$$C_e = C_m + C_n = (m+n)G_o/\omega_e \quad (23)$$

The initial value of the impedance $Z$, at $x=0$, is $$Z_o = \frac{1}{G_o + G_n} = \frac{1}{G_o(1+n')} \quad (24)$$

The general expression corresponding to Equations (10) and (21) above is $$Z_o C_e \omega_e = \frac{m+n}{1+n'} \quad (25)$$

It is necessary to derive relationships between $n$ and $n'$ which give the closest approach to uniform impedance over the pass band.

The relative impedance of $G_n$, $C_n$ and $Z_i$ in parallel is $$\frac{Z}{Z_o} = \frac{G_o + G_n}{G_n + G_o\sqrt{1-(\omega/\omega_c)^2} + j\omega C_n} = \frac{1+n'}{n' + \sqrt{1-x^2} + jxn} \quad (26)$$

The impedance is complex at all frequencies and still has the discontinuity at the cutoff frequency. In the pass band, the relative magnitude of the impedance is $$\left|\frac{Z}{Z_o}\right| = \frac{1+n'}{\sqrt{(n'+\sqrt{1-x^2})^2 + x^2 n^2}} \quad (27)$$

The impedance has a lagging phase angle $$b = \tan^{-1}\frac{nx}{n' + \sqrt{1-x^2}} \quad (28)$$

In the attenuation band, the relative magnitude of the impedance is $$\left|\frac{Z}{Z_o}\right| = \frac{1+n'}{\sqrt{n'^2 + (\sqrt{x^2-1}+xn)^2}} \quad (29)$$

and the lagging phase angle is $$b = \tan^{-1}\frac{nx + \sqrt{x^2-1}}{n'} \quad (30)$$

Theoretically uniform impedance over the pass bands is not possible, but the condition for approximate uniformity is obtained from Formula (27) by expanding $$\sqrt{1-x^2}$$

into a series convergent in the pass band:

$$\left|\frac{Z}{Z_o}\right| = \frac{1+n'}{\sqrt{(1+n')^2 - x^2(1-n^2+n') - n'x^4/4 - \ldots}} \quad (31)$$

The coefficient of $x^2$ cancels out under the condition $$n = \sqrt{1+n'} \quad \text{or} \quad n' = n^2 - 1 \quad (32)$$

leaving only relatively small terms in the higher powers of $x$:

$$\left|\frac{Z}{Z_o}\right| = 1 + \frac{n'x^4}{8(1+n')^2} + \ldots \quad (33)$$

At the cutoff frequency, the peak value is $$\left|\frac{Z}{Z_o}\right| = \frac{1+n'}{\sqrt{1+n'+n'^2}} = \sqrt{1 + \frac{n'}{1+n'+n'^2}} \quad (34)$$

The greatest peak value is $$\sqrt{4/3} = 1.15$$

corresponding to $n'=1$. The approximately uniform impedance is obtained across maximum shunt capacitance if $m=1$, so Equation (25) becomes $$Z_o C_e \omega_e = \frac{1 + \sqrt{1+n'}}{1+n'} \quad (35)$$

It is to be noted that this figure of merit decreases with increasing shunt conductance.

Fig. 4 shows a family of impedance curves for various values of shunt conductance in terms of the parameter $n'$; the value of $n$ in each case being that required by Equation (32) for approximately uniform impedance. The figure indicates some advantages of the shunt conductance. The peak at the cutoff frequency can be used to compensate for the rounding effect of dissipation in the filter and of mismatching at the far end of the filter.

The low-pass two-terminal networks described above may be utilized to maintain a limiting impedance (maximum impedance) across a capacitance element or a limiting impedance (maximum admittance) through an inductance element. The former may be used to secure maximum voltage from a current-regulated generator, such as a vacuum tube having large internal resistance and appreciable shunt capacitance. The latter may be used to secure maximum current from a voltage-regulated generator, such as a moving coil having small internal resistance and appreciable series inductance. The capacitance or inductance is the total of both input and output circuits.

The dead-end filter of the invention also may be utilized in a four-terminal network and each of the two terminal devices, the generator and the load, may have either shunt capacitance or series inductance. There are four permutations of such four-terminal networks. In general, each of the terminal devices is limited in performance, over a wide frequency band, by either shunt susceptance or series reactance. A current-regulated generator or a voltage-responsive device have in common the property of small shunt conductance, and the limitation is imposed by shunt susceptance. A voltage-regulated generator or a current-responsive load have in common the property of small series resistance and the limitation is imposed by series reactance.

The four-terminal networks of the invention employ the above recited principles for maintaining a predetermined impedance across susceptance, or a predetermined admittance through reactance, over a wide band of frequencies. The total susceptance or reactance of the circuits to be coupled is divided into smaller component portions connected in different sections of a filter, so that the impedance or admittance of the filter is limited not by the total but by the greatest indivisible portion.

The four-terminal networks of the invention are best exemplified by separating the input and output devices in the filter, instead of connecting them directly in parallel or in series. Further benefits may be obtained by further subdivision involving more than two pairs of terminals. For example, the capacitance to ground of connecting leads or of a large grid condenser may be separated and may comprise a reactive element of another section of the filter.

Figs. 5a–8c, inclusive, are the bases of the theoretical explanation of four-terminal networks. They are developed from low-pass filters but exemplify all filters having a finite total band width. The capacitive and inductive arms shown are, respectively, the parallel and series arms of low-pass filters. While a shunt conductance $G_n$ or series resistance $R_n$ is shown in the filters of Figs. 5a–8c, inclusive, it will be understood that, under the principles outlined above, this resistance may be of such value as to have an inappreciable effect, in which case it can be neglected; or, by including the parameter $n'$ in the expressions involving the filter reactance elements, the filter can be so designed as to take into account the effect of this resistance or conductance.

Figs. 5a–5c, inclusive, represent the development of a filter for building up a uniform impedance across susceptance. Fig. 5a is essentially a two-terminal network with the susceptance of a capacitance element $C_n$ across its terminals. In Fig. 5a the relationships of Equations (5), (6), and (7), given above, apply. The dead-end filter of Fig. 5a is assumed to be nondissipative. It is shown divided in two parts 10 and 11, which division is a basis for the analysis of the four-terminal networks. The dead-end filter 10, 11 may correspond to that shown in Fig. 3, and similar circuit elements have been given identical reference numerals. Elements $C_m'$ and $C_m''$ are the respective mid-shunt condensers of parts 10 and 11 at their adjacent ends. The network 10 is supplied with input current $I_1$ from a current-regulated generator (not shown), which develops across Z the output voltage $E_2$ which is the same as the input voltage $E_1$ across the generator terminals:

$$E_2 = E_1 = ZI_1 \qquad (36)$$

The part 10 of the dead-end filter is "symmetrical" in that it has the same constant-$k$ mid-shunt image impedance at both ends. This does not require symmetry of circuit arrangement within the filter, and does not require any constant-$k$ half-sections in the filter, although both of these attributes may be present. The part 11 of the dead-end filter has constant-$k$ mid-shunt image impedance at the end coupled to part 10, while at the opposite end it has preferably $m$-derived image impedance assumed to match the terminal resistor $R_o$ over the pass band. At the junction of parts 10 and 11, the mid-shunt capacitance elements have the values:

$$C_m' = m'/R_o \omega_c; \quad C_m'' = m''/R_o \omega_c$$
$$C_o' = C_m' + C_m'' = (m' + m'')/R_o \omega_c \qquad (37)$$

in which:
$m'$ and $m''$ are the derivation factors of the half-sections at the junction of the two parts of the filter;
$C_o'$ is the total capacitance at the junction, usually a single circuit element.

Since the part 10 of the dead-end filter is nondissipative and has equal image impedance at both ends and since the entire filter is terminated by $R_o$ in such a manner as to prevent reflection, there is developed at the junction of parts 10 and 11 a voltage equal to that across the input terminals, though displaced in phase. Therefore, the output voltage $E_2$ can just as well be obtained at the junction as shown in Fig. 5b. It is then determined by the characteristics of both the input impedance Z and the transfer impedance of part 10 of the filter:

$$\frac{E_2}{I_1} = \frac{E_1}{I_1} \frac{E_2}{E_1} = Z \epsilon^{-a-jb} \qquad (38)$$

in which $(a+jb)$ represents the attenuation in napiers and the phase lag in radians in the active portion 10 of the filter. Part 11 is still inactive and functions only as a dead-end network to control the impedance. The attenuation $a$ is assumed to be zero in the pass band.

The phase shift and attenuation obtained by making the part 10 of the filter active between input and output terminals may or may not be desired, but there is a definite advantage in that the limitation on the impedance, imposed by the shunt capacitance is cut in half by distributing the input and output capacitance between different parts of the filter. In a filter of given impedance and band width, this doubles the total capacitance permitted across the input and output circuits. Alternatively, if the total capacitance and band width are given, this expedient doubles the impedance that can be maintained uniform over the pass band.

The transfer impedance given by Equation (38) is a reciprocal property of a four-terminal network. Therefore, the network of Fig. 5b can be reversed as shown in Fig. 5c, while retaining its transfer characteristics unchanged. The dead end of the filter is changed over from the output side to the input side.

Figs. 6a, 6b, and 6c are reciprocally analogous to Figs. 5a, 5b, and 5c by interchange of concepts, such as current and voltage, impedance and admittance, susceptance and reactance, resistance and conductance, capacitance and inductance, shunt and series, etc., the dead-end filter of the invention being, in this case, divided into parts 12 and 13. In Fig. 6a the admittance Y, which is uniform over the pass band of the dead-end filter, is developed through the two inductance elements $L_m$ and $L_n$ in series. The former is regarded as the mid-series arm of the filter, per se, and the latter is regarded as an external auxiliary inductance element, but both are usually merged in a single inductance element denoted $L_o$. Their values are $$L_m = m/G_0\omega c; \quad L_n = n/G_0\omega c$$
$$L_o = L_m + L_n = (m+n)/G_0\omega c \qquad (39)$$

in which $G_o = Y_o 1/R_o$ is the "mid-band" value of admittance Y (at zero frequency in the low-pass case). For uniform admittance, $n=1$.

The two-terminal network 12 is supplied with input voltage $E_1$ from a voltage-regulated generator, which develops through Y the output current $I_2$ which is the same as the input current $I_1$ from the generator:

$$I_2 = I_1 = YE_1 \qquad (40)$$

The filter is separated into parts 12 and 13 with constant-$k$ mid-series image impedance at the junction of the parts, where the inductance elements have the values:

$$L_m' = m'/G_0\omega c; \quad L_m'' = m''/G_0\omega c$$
$$L_o' = L_m' + L_m'' = (m' + m'')/G_0\omega c \qquad (41)$$

In the arrangement of Fig. 6b, the output current $I_2$ is obtained at the filter junction. It is determined by the characteristics of both the input admittance Y and the transfer admittance of active part 12 of the filter:

$$\frac{I_2}{E_1} = \frac{I_1}{E_1} \cdot \frac{I_2}{I_1} = Y \epsilon^{-\alpha-jb} \qquad (42)$$

The limitation on the input admittance, imposed by the total series inductance of input and output circuits, is cut in half relative to Fig. 6a.

Figs. 7a, 7b, 7c, and Figs. 8a, 8b, and 8c show the development of coupling networks in which the input and output circuits have reciprocal properties, that is, shunt susceptance and series reactance, or vice versa. The active part of each filter has "reciprocal symmetry" of image characteristics; that is, it has mid-shunt image impedance at one end and mid-series image admittance at the other end, both being of the constant-$k$ form. Since they are reciprocal, the quotient of output current and input voltage, or of output voltage and input current, is constant in the pass band, although subject to phase shift. The constant value of the quotient is the mid-band impedance $R_o$ or its reciprocal $G_o$. These relations follow from the conservation of power as the wave travels through the filter.

Figure 7A:
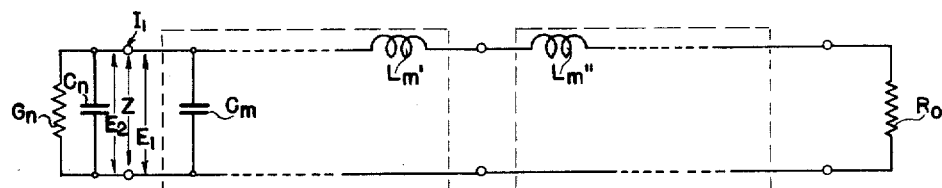
Figure 7B:
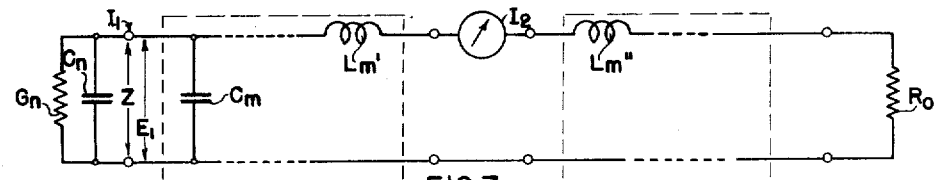

In Fig. 7b, the essential property of the four-terminal network is its transfer ratio, $$\frac{I_2}{I_1} = \frac{E_1}{I_1} \cdot \frac{I_2}{E_1} = \frac{Z}{Z_o} \epsilon^{-\alpha-jb} \qquad (43)$$

Figure 7C:
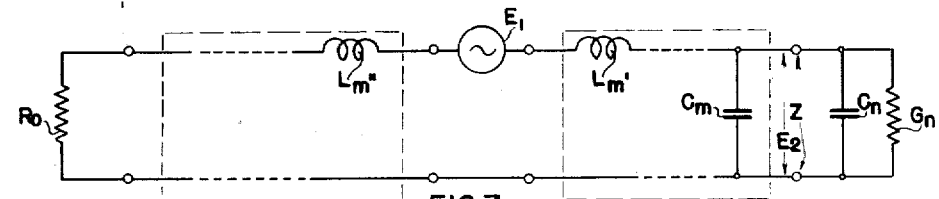

The same transfer ratio is retained in Fig. 7c in which the order of components is reversed:

$$\frac{E_2}{E_1} = \frac{I_2}{E_1} \cdot \frac{E_2}{I_2} = \frac{Z}{Z_o} \epsilon^{-\alpha-jb} \qquad (44)$$

Figure 8A:
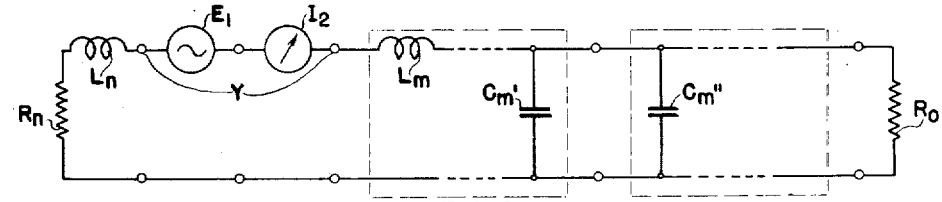
Figure 8B:
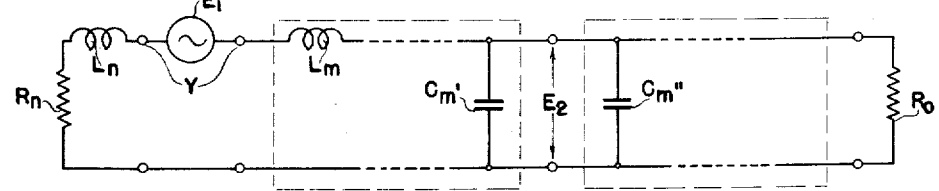
Figure 8C:
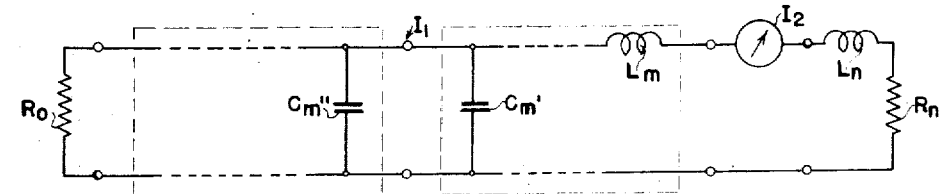

In Fig. 8b, the essential property of the filter is its transfer ratio, $$\frac{E_2}{E_1} = \frac{I_1}{E_1} \cdot \frac{E_2}{I_1} = \frac{Y}{Y_o} \epsilon^{-\alpha-jb} \qquad (45)$$

which is retained in Fig. 8c:

$$\frac{I_2}{I_1} = \frac{E_2}{I_1} \cdot \frac{I_2}{E_2} = \frac{Y}{Y_o} \epsilon^{-\alpha-jb} \qquad (46)$$

By way of summary, Figs. 5a–8c, inclusive, show two types of two-terminal networks and eight types of four-terminal networks, the latter including four permutations of input and output circuits of the two kinds, that is, one kind having shunt susceptance and one kind having series reactance, each permutation having two types depending on whether the dead-end filter is on the input or output side. In the low-pass filter examples shown, the susceptance is in the shunt capacitance of a current-regulated generator or a voltage-responsive load, while the reactance is in the series inductance of a voltage-regulated generator or a current-responsive load.

The above principles may be applied in proportioning a dead-end filter of the band-pass type and Fig. 9 is given by way of example of this type of filter. It will be seen that the band-pass filter of Fig. 9 corresponds closely to the low-pass filter of Fig. 8c; the principal difference being that the condensers $C_m'$ and $C_m''$ are effectively tuned by inductance elements $L_n'$ and $L_n''$, respectively, connected in parallel therewith and that condensers $C_a$ and $C_b$ have included in series therewith inductances $L_m$ and $L_n$, respectively. It will be understood that the analogy utilized to convert Fig. 8c into a band-pass filter can also be utilized to convert any of the filters of Figs. 5a–8b, inclusive, to a corresponding band-pass filter.

It will also be understood that the parameter $n'$ utilized in Equations (22)–(35), inclusive, above, to take into account shunt conductance across the input or impedance terminals of the filter of Fig. 3, may likewise be utilized to take into account shunt conductance or series resistance in other figures as follows: shunt conductance across the impedance terminals of Figs. 5a, 5b, 5c and 7a, 7b, 7c, these being the input terminals of Figs. 5a, 5b, 7a, and 7b and the output terminals of Figs. 5c and 7c; series resistance between the admittance terminals of Figs. 6a, 6b, 6c and 8a, 8b, 8c, these being the input terminals of Figs. 6a, 6b, 8a, and 8b and the output terminals of Figs. 6c and 8c. The resistance or conductance may include dissipation in the filter elements, per se, or in the associated circuits, either inherent or intentionally added.

Each of Figs. 10a–10e, inclusive, shows a different four-terminal arrangement embodying the above principles in several different practical forms of low-pass four-terminal networks. The terminal circuits are indicated in the drawings. The constant-$k$ and $m$-derived filter sections or half-sections are denoted $k$ and $m$, respectively. The dead-end filter of Fig. 10a comprises confluent filter sections including, in the order named, a constant-$k$ section, an $m$-derived half-section, and the terminating resistor $R_o$. The dead-end filter of Fig. 10b comprises confluent filter sections including, in the order named, a constant-$k$ section, a constant-$k$ half-section, an $m$-derived half-section, and the terminating resistor $R_o$. The dead-end filter of Fig. 10c comprises confluent filter sections including, in the order named, two constant-$k$ sections, an $m$-derived half-section, and the terminating resistor $R_o$. The dead-end filter of Fig. 10d comprises confluent filter sections including, in the order named, an $m$-derived section, an $m$-derived half-section, and the terminating resistor $R_o$. The dead-end filter of Fig. 10e comprises confluent filter sections including, in the order named, a constant-$k$ half-section, an $m$-derived section, a constant-$k$ half-section, a constant-$k$ whole section, an $m$-derived half-section, and the terminating resistor $R_o$. In view of the reciprocal symmetry of the four-terminal networks shown in Figs. 10a–10e, inclusive, it will be understood that each of the terminal circuits indicated in the drawings can be either an input or an output circuit.

Fig. 11 shows, by way of example, a four-terminal band-pass network comprising a shunt capacitance and shunt inductance across the terminal circuits thereof. The low-pass filter of Fig. 10c may be converted into the band-pass filter of Fig. 11 by utilizing the principles outlined above to convert the low-pass filter of Fig. 8c to the band-pass filter of Fig. 9. The band-pass dead-end filter of Fig. 11 comprises, in the order named, a modified constant-$k$ section of which capacitances $C_m$ and $C_m'$ are circuit elements, an $m$-derived half-section, and the terminating resistor $R_o$.

It will thus be seen that, by making $n$ unity in the above equations, the dead-end filters of the invention are effective to provide a uniform impedance across the terminal circuits of the filter; that is, maximum impedance across the terminals, a filter of the invention comprising shunt susceptance effectively across its terminals, and minimum impedance or maximum admittance between terminals comprising inductance effectively in series therewith. If amplitude correction is required between the input current or voltage and the output current or voltage of the terminal circuits involved, it can be secured by making $n$ different from unity. If phase correction is required between the input and output currents of voltages, phase-correcting networks may be inserted in the active part of the filter. An example of a low-pass filter in which phase correction is provided is found in the circuit of Fig. 10e, wherein the $m$-derived filter section denoted $m''''$ in the drawings may be designed for $m''''>1$, involving negative mutual inductance.

As illustrative of the practical applications of the above-described networks, the following list includes various types of wide band networks and some of the uses to which they are adapted. The dead-end filter of the invention may be on the input or the output side. In this list, shunt capacitance is denoted by (C); series inductance is denoted by (L); and the combination of both, in series or parallel, is denoted as (CL). Each of these elements may be included in the filter design.

TELEVISION

*Video frequency (low-pass)*

Camera tube (C) to shielded cable (C) to amplifier grid (C).
Amplifier anode (C) to condenser (C to ground) to amplifier grid (C).
Amplifier anode (C) to shielded cable (C) to amplifier grid (C).
Amplifier anode (C) to shielded cable (C) to picture-tube grid (C).

*Video-Signal translator (band-pass)*

Amplifier anode (C) to amplifier grid (C).
Amplifier anode (C) to shielded line to low-impedance antenna (CL).
Amplifier anode (C) to shielded line to high-impedance antenna (CL), the limiting factor being shunt susceptance.
Low-impedance antenna (CL), the limiting factor being series reactance, to shielded line to amplifier grid (C).
High-impedance antenna (CL), the limiting factor being shunt susceptance, to shielded line to amplifier grid (C).

*Scanning (low-pass)*

Amplifier anode (C) to deflecting plates (C).
Amplifier anode (C) to deflecting coils (CL), the limiting factor being series reactance.

*Scanning (band-pass)*

Amplifier anode (C) to transformer (CL), the limiting factor being shunt susceptance, to deflecting plates.
Amplifier anode (C) to transformer (CL) to deflecting coils (CL), the limiting factor being series reactance.

SOUND

*Audio frequency (band-pass)*

Amplifier anode (C) to transformer (CL) to amplifier grid (C).
Moving coil (L) microphone or phonograph pick-up to transformer (CL) to amplifier grid (C).
Amplifier anode (C) to transformer (CL) to moving coil (L) loud-speaker or receiver.
Condenser (C) microphone or phonograph pick-up to transformer (CL) to amplifier grid (C).
Amplifier anode (C) to transformer (CL) to condenser (C) loud-speaker or receiver.

Each of Figs. 12–14, inclusive, shows an actual circuit arrangement utilizing the principles outlined above. In Fig. 12 there are shown three vacuum tubes 20, 21, and 22 included in succeeding stages of a vacuum-tube amplifier and coupled in cascade by means of filter circuits embodying the present invention. The output circuit of vacuum tube 20 is coupled to the input circuit of vacuum tube 21 by means of band-pass filter 23, in which the shunt capacitive filter elements 24 and 25 are comprised mainly of the inherent output capacitance of tube 20 and input capacitance of tube 21, respectively. Similarly, the output circuit of vacuum tube 21 is coupled to the input circuit of vacuum tube 22 by a filter 26 in which the shunt capacitive filter elements 27 and 28 are comprised mainly of the inherent output capacitance of tube 21 and input capacitance of tube 21 and input capacitance of tube 22, respectively.

Figure 10A:
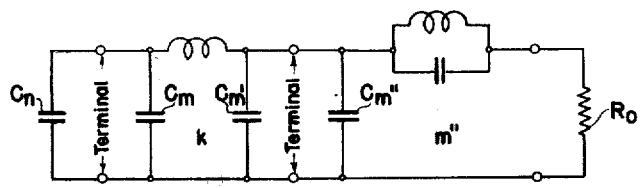
Figure 10B:
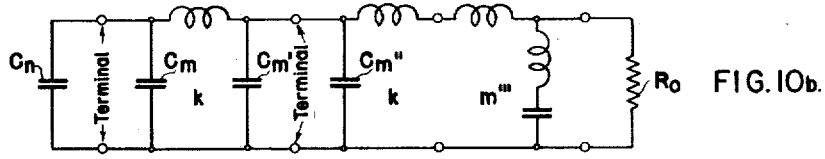
Figure 10C:
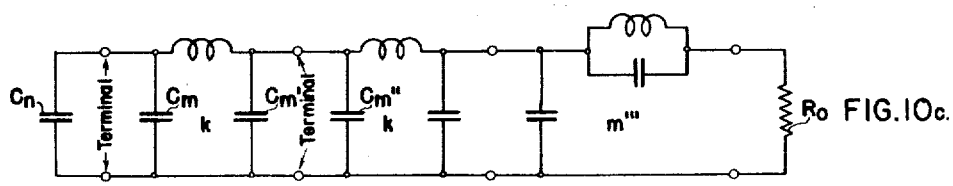
Figure 10D:
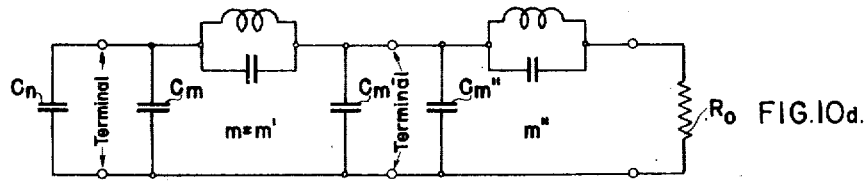
Figure 10E:
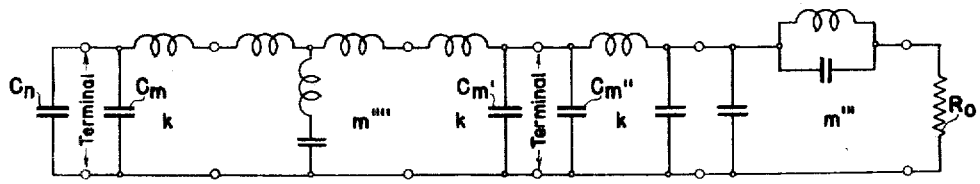

It will be seen that the filter 23 corresponds in type to that shown in Fig. 10a, certain of the adjacent capacitance elements having been combined into single elements. Thus, the condenser 24 of Fig. 12 corresponds, in effect, to both of condensers $C_n$ and $C_m$ of Fig. 10a and condenser 25 corresponds to condensers $C_m'$ and $C_m''$. Resistor 23' of Fig. 12 corresponds to terminating resistor $R_o$ of Fig. 10a.

Filter 26 is similar to filter 23, except that the input and output terminals have been reversed and the addition of grid-leak resistor 29 makes it necessary to compute the constants of the filter using the parameter $n'$ to take into account shunt conductance across a terminal circuit of the filter. The coupling circuits 23 and 26 may have different impedance-frequency characteristics over a wide range of frequencies and the constants of the filters may be so proportioned as to make these characteristics complementary over the frequency band, giving nearly uniform response over the pass band of the amplifier.

The filters 23 and 26 may be proportioned in accordance with the relationships expressed in Equation (15) which reduce to the following expressions, the subscripts (1) referring to the filter 23 and the subscripts (2) to the filter 26, the other parameters utilized in the expressions having the definitions given above:

$$\left|\frac{Z}{R_o}\right|_1 = \frac{1}{\sqrt{1-x^2(1-n_1^2)}} \quad (47)$$

$$\left|\frac{Z}{R_o}\right|_2 = \frac{1}{\sqrt{1-x^2(1-n_2^2)}} \quad (48)$$

$$\left|\frac{Z}{R_o}\right|_1 \cdot \left|\frac{Z}{R_o}\right|_2 = \frac{1}{\sqrt{1-x^2(2-n_1^2-n_2^2)+x^4(1-n_1^2)(1-n_2^2)}} \quad (49)$$

To make the above product expressed in Equation (49) approximately constant, which is a requisite for uniform gain over the pass band of the amplifier, $n_1$ and $n_2$ are chosen in such relation as to cancel the coefficient of $x^2$:

$$2 - n_1^2 - n_2^2 = 0: \; n_1 = \sqrt{2-n_2^2} \text{ or } n_2 = \sqrt{2-n_1^2} \quad (50)$$

The product is then $$\left|\frac{Z}{R_o}\right|_1 \left|\frac{Z}{R_o}\right|_2 = \frac{1}{\sqrt{1-x^4(1-n_1^2)^2}} = \frac{1}{\sqrt{1-x^4(1-n_2^2)^2}} \quad (51)$$

which is nearly uniform because the $x^4$ term is small over at least the greater portion of the pass band. The upward trend of the impedance characteristic toward the cutoff frequency of filters of the invention, in which $n$ is different from unity, may be utilized to compensate for filter attenuation in the circuit of Fig. 12. If the parameters $n_1$ and $n_2$ are both unity, each of filters 23 and 26 has a uniform impedance over the pass bands. As examples of values of $n_1$, relating to impedance characteristics of filter 23 having an upward trend in the pass band, and of $n_2$, relating to complementary impedance characteristics of filter 26, having a downward trend in the pass band, by use of which the impedances of the two filters vary in a complementary manner over the pass band, so that an approximately uniform overall response is obtained from the amplifier of Fig. 12, the circuit constants may be proportioned according to the following relative parameters:

| $n_1$ | $n_2$ |
|---|---|
| 0.7 | 1.23 |
| 0.6 | 1.28 |
| 0.5 | 1.32 |
| 0 | 1.41 |

Tubes 20 and 21 may be relatively small, thus having relatively small electrode capacitances, and the tube 22 may be relatively large, thus having a relatively large input electrode capacitance. Attention is called to the fact that, with the numerical values given above for parameters $n_1$ and $n_2$, filter 26 may include a shunt capacitance 26, which comprises the input capacitance of tube 22, which is materially greater than the shunt capacitance 27, which comprises the output capacitance of tube 21.

Attention is also directed to the fact that the resistance 29 with filter 26 may be taken into account and that the filter 26 may be proportioned in accordance with the curves of Fig. 4 and Equations (22)–(35), inclusive, so that filter 26 has a substantially uniform variation of impedance over the frequency range of the amplifier. The following parameters may be selected for such a filter:

$$n_2' = 0.5$$
$$n_2 = 1.22$$

In Fig. 13, there is shown another adaptation of a filter designed in accordance with the invention, as a band-pass coupling system between two amplifier tubes 30 and 31 in which nearly the ideal maximum impedance is obtained in the coupling filter 32 over the pass band of the amplifier. This is an example of an application of the two-terminal network of the invention, the inductance elements of the filter being replaced by transformers 33 and 34. The filter may be designed to compensate for resistance 35 effectively across the terminal circuit of the filter 32. This resistance may be comprised in whole, or in part, of the inherent resistance of the primary circuit of transformer 34, which may be appreciable if the pass band of the amplifier is narrow and the transformer 34 is built very small in order to minimize its inherent capacitance. The other circuit elements of the filter are then proportioned in accordance with the principles outlined above, particularly Equations (22)–(35), inclusive, to maintain subtantially uniform impedance over the pass band in the presence of shunt conductance, as indicated by the curves of Fig. 4.

In Fig. 14 there is shown a dead-end filter designed in accordance with the invention for coupling a push-pull power amplifier comprising tubes 40 and 41 to an antenna, the reactive constants of which are represented by the elements within the dotted line 42. The antenna is assumed to be resonant in the middle of the pass band by its series inductance and capacitance, represented respectively by inductances 43 and 44 and condensers 45 and 46. The shunt capacitance at the antenna terminals may also be included in the filter design, if appreciable, as part of condenser 47. The antenna may be a balanced doublet. The radiation resistance represented by resistor 56 involves the parameter $n'$ of the above expressions. The value of $n'$ must be comparable with unity if a compromise is desired between efficiency of power radiation and tolerance of antenna reactance. If $n'$ is equal to unity, the reflection of power at the antenna end is prevented in the middle of the frequency band. This is desirable if the carrier, or at least most of the signal energy, is concentrated in the middle of the frequency band.

The output capacitance of the stage of push-pull amplification comprising tubes 40 and 41 is represented by condenser 48, one of the circuit elements of the coupling filter. Transformers 49, 50, 51, 52, and 53 are utilized to replace inductance elements of the filter of the invention in a conventional manner. The coupling system of the circuit of Fig. 14 corresponds to the general type shown in Fig. 8c in that the input circuit is across shunt susceptance (capacitance 48) and the output circuit has in series therewith inductances 43, 44 and conductance 47. The prototype of the circuit of Fig. 14, comprising individual filter sections in which the inductances have not been replaced by transformers, is a dead-end filter comprising, in the order named, a terminating resistor at the dead end which is the full equivalent of resistors 54, 55, an $m$-derived half-section the image impedance of which matches the resistance of the terminating resistor over the pass band, the input terminals across which capacitance 48 is coupled, a constant-$k$ section, a second $m$-derived half-section, a third $m$-derived half-section, a constant-$k$ whole section, a constant-$k$ half-section, and the output terminals in series with which are the equivalent elements of the antenna comprising inductances 43, 44, capacitances 45, 46 and the conductance represented by resistor 47. The coupling filter utilized in Fig. 14 thus provides substantially uniform transmission from a power amplifier with shunt susceptance across its output terminals to an antenna having effective series reactance.

It will be understood that in the design of the dead-end filters of the invention, the preferred value of $m$ is of the order of 0.6. Values of $m$ between the limits of 0.5 to 0.7 result in a matching of the image impedance of the $m$-derived filter section with the terminating resistor $R^o$ at two points in a low-pass band or four points in a band-pass filter. Filters having an $m$-derived termination with a value of $m$ more than 0.7 cannot match the terminal resistor $R^o$ at more than one point in a low-pass band or two points in a band-pass filter. Each additional $m$-derivation included in the filter termination makes it possible to match the image impedance with the terminal resistor at one additional point in a low-pass band or two additional points in a band-pass filter.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A signal-translating system for operation over a range of frequencies comprising one or more pairs of terminals between one pair of which there is effectively substantial reactance and substantial resistance both tending to limit the response of said system over said range, a dead-end filter having a predetermined image impedance over said range coupled to said one of said pairs of terminals, said filter comprising only a part of said reactance as a terminal mid-element of said filter, and an impedance termination coupled to the dead end of said filter proportioned substantially to match the image impedance of said filter over said range, the reactive constant of said dead-end filter being so proportioned relative to said reactance, said resistance, and the operating frequency range that the impedance between said one of said pairs of terminals over said range is substantially uniform and approximately the limiting value that can be maintained between said one pair of terminals over said range.

2. A signal-translating system for operation over a wide range of frequencies comprising one or more pairs of terminals in series with one pair of which there is effectively substantial inductance and substantial resistance both tending to limit the response of said system over said range, a dead-end filter having a predetermined image impedance over said range coupled to said one of said pairs of terminals, said filter comprising only a part of said inductance as a terminal mid-series element of said filter, and an impedance termination coupled to the dead end of said filter proportioned substantially to match the image impedance of said filter over said range, the reactive constants of said dead-end filter being so proportioned relative to said inductance, said resistance, and the operating frequency range that the admittance between said terminals is substantially constant and approximately the maximum that can be maintained between said one pair of terminals over said range.

3. A signal-translating system for operation over a wide range of frequencies comprising one or more pairs of terminals across one pair of which there is effectively substantial capacitance and substantial conductance both tending to limit the response of said system over said range, a dead-end filter having a predetermined impedance over said range coupled to said one of said pairs of terminals, said filter comprising only a part of said capacitance as a terminal mid-shunt element of said filter, and an impedance termination coupled to the dead end of said filter proportioned substantially to match the image impedance of said filter over said range, the reactive constants of said dead-end filter being so proportioned relative to said capacitance, said conductance, and the operating frequency range that the impedance across said one pair of terminals is substantially constant and approximately the maximum that can be maintained across said one pair of terminals over said range.

4. A signal-translating system for operation over a wide range of frequencies comprising two or more pairs of terminals across a first pair of which there is effectively capacitance and conductance and across a second pair of which there is effectively capacitance, said capacitances and said conductance tending to limit the response of said system over said range, a dead-end filter having a predetermined image impedance over said range coupled to said first pair of terminals, said filter comprising only a part of the impedance associated with said first pair of terminals as a terminal mid-shunt element of said filter and comprising the impedance associated with said second pair of said terminals as a full-shunt element of said filter, and an impedance termination coupled to the dead end of said filter proportioned substantially to match the image impedance of said filter over said range, the reactive constants of said dead-end filter being so proportioned relative to the impedance across said first pair of terminals and the operating frequency range that the impedance across said first pair of terminals is substantially constant and approximately the maximum that can be maintained across said first pair over said range.

5. A signal-translating system for operation over a wide range of frequencies comprising two or more pairs of terminals across a first pair of which there is effectively capacitance and conductance and across a second pair of which there is effectively capacitance, said capacitances and said conductance tending to limit the response of said system over said range, a dead-end filter having a predetermined image impedance over said range coupled to said first pair of terminals, said filter comprising only a part of the capacitance across said first pair of terminals as a terminal mid-shunt element of said filter and comprising the capacitance across said second pair of terminals as a full-shunt element of said filter, and an impedance termination coupled to the dead end of said filter proportioned substantially to match the image impedance of said filter over said range, the reactive constants of said filter being proportioned in accordance with the expression $n^2 - n' = 1$ where the parameters have the significance given in the specification.

6. A signal-translating system for operation over a wide range of frequencies comprising one or more pairs of terminals in series with a first pair of which there is effectively substantial inductance and substantial resistance and in series with a second pair of which there is effectively substantial inductance, said elements tending to limit the response of said system over said range, a dead-end filter having a predetermined image impedance over said range coupled to said first pair of terminals comprising only a part of the impedance associated with said first pair of terminals as a terminal mid-series element of said filter and comprising the impedance associated with said second pair of terminals as a full-series element of said filter, and an impedance termination coupled to the dead end of said filter proportioned substantially to match the image impedance of said filter over said range, the reactive constants of said filter being so proportioned with respect to the impedance associated with said first pair of terminals and the operating frequency range that the admittance between said first pair of terminals is substantially constant and approximately the maximum that can be maintained between said first pair of terminals over said range.

7. A signal-translating system for operation over a wide range of frequencies comprising two or more pairs of terminals in series with a first pair of which there is effectively substantial inductance and substantial resistance and across a second pair of which there is effectively substantial capacitance, said inductance, resistance, and capacitance tending to limit the response of said system over said range, a dead-end filter having a predetermined image impedance over said range coupled to said first pair of terminals, said filter comprising only a part of the impedance associated with said first pair of terminals as a terminal mid-series element of said filter and utilizing the impedance associated with said second pair of terminals as a full-shunt element of said filter, and an impedance termination coupled to the dead end of said filter proportioned substantially to match the image impedance of said filter over said range, the reactive constants of said dead-end filter being so proportioned relative to said impedance associated with said first pair of terminals and the operating frequency range that the admittance between said first pair of terminals over said range is substantially constant and approximately the maximum that can be maintained between said first pair of terminals over said range.

8. A signal-translating system for operation over a wide range of frequencies comprising two or more pairs of terminals across a first pair of which there is effectively substantial capacitance and substantial conductance and in series with a second pair of which there is effectively substantial inductance, said capacitance, conductance, and inductance tending to limit the response of said system over said range, a dead-end filter having a predetermined image impedance over said range coupled to said first pair of terminals comprising only a part of the capacitance associated with said first pair of terminals as a terminal mid-shunt element of said filter and comprising the impedance associated with said second pair of terminals as a full-series element of said filter, and an impedance termination coupled to the dead end of said filter proportioned substantially to match the image impedance of said filter over said range, the reactive constants of said filter being so proportioned relative to the impedance associated with said first pair of terminals and the operating frequency range that the impedance across said first pair of terminals over said range is substantially constant and approximately the maximum impedance which can be maintained across said terminals over said range.

9. A signal-translating system for operating over a wide range of frequencies comprising two component networks coupled in cascade, each of said networks comprising a pair of terminals between which there is effectively reactance tending to limit the response of said system over said range, two dead-end filters having the same cut-off frequencies and each having a predetermined image impedance over said range coupled respectively to said pairs of terminals, each of said filters comprising only a part of the reactance coupled to its respective terminals as a terminal mid-element of the filter, and an impedance termination coupled to the dead end of each of said filters proportioned substantially to match the image impedance of the filter over said range, the reactive constants of said dead-end filters being so proportioned relative to said terminal reactance and the operating frequency range that the mean value of impedance between said pairs of terminals is substantially the limiting value of impedance which can be maintained between said terminals over said range, said impedances varying in a complementary manner over said range, whereby a predetermined response is obtained from said system over said frequency range.

10. A signal-translating system for operation over a wide range of frequencies comprising two component networks coupled in cascade, each of said networks comprising a pair of terminals between which there is effectively reactance tending to limit the response of said system over said range, two dead-end filters having the same cutoff frequencies and each having a predetermined image impedance over said range coupled respectively to said pairs of terminals, each of said filters comprising only a part of the reactance coupled to its respective terminals as a terminal mid-element at the active end of the filter, and an impedance termination coupled to the dead end of each of said filters proportioned substantially to match the image impedance of the filter over said range, the reactive constants of said dead-end filters being proportioned in accordance with the expression $n_1^2 + n_2^2 = 2$ where $n_1$ is a parameter of one of said filters and $n_2$ a parameter of the other of said filters, said parameters having the significance defined in the specification.

11. A signal-translating system for operation over a wide range of frequencies for coupling a first terminal circuit comprising inherent shunt capacitance to a series-resonant terminal circuit including series resistance, said capacitance and the elements of said series-tuned circuit tending to limit the response of said system over said range, a dead-end band-pass filter having a predetermined image impedance over said range coupled to said terminal circuits comprising only a part of the reactive elements of said series-tuned circuit as a terminal mid-series arm of said filter and comprising said capacitance as a full-shunt element of said filter, and an impedance termination coupled to the dead end of said filter proportioned substantially to match the image impedance of said filter over said range, the reactive constants of said filter being so proportioned with respect to the reactive constants of said series-tuned circuit and the operating frequency range that the admittance through said series-tuned circuit and said filter is substantially constant and approximately the maximum that can be maintained over said range.

12. A signal-translating system for operation over a wide range of frequencies for coupling the output circuit of a vacuum-tube amplifier having inherent output capacitance to a series-resonant terminal circuit including series resistance, said capacitance and the elements of said series-tuned circuit tending to limit the response of said system over said range, a dead-end band-pass filter having a predetermined image impedance over said range coupled to said terminal circuit and comprising only a part of the reactive elements thereof as a terminal mid-series element of said filter and comprising said capacitance as a full-shunt element of said filter, and an impedance termination coupled to the dead end of said filter proportioned substantially to match the image impedance of said filter over said range, the reactive constants of said filter being so proportioned with respect to the reactive constants of said series-tuned circuit and the operating frequency range that the admittance through said series-tuned circuit and the filter is substantially constant and approximately the maximum that can be maintained over said range.

13. A signal-translating system for operation over a wide range of frequencies comprising a first terminal circuit having inherent shunt capacitance, a uniform impedance transmission line and a series-resonant terminal circuit including series resistance, said capacitance and the elements of said series-tuned circuit tending to limit the response of said system over said range, a dead-end filter coupled between said first terminal circuit and one end of said transmission line and comprising said capacitance as a full-shunt element of said filter, and an impedance termination coupled to the dead end of said filter proportioned substantially to match the image impedance of said filter over said range, a second filter coupled between the other end of said transmission line and said series-tuned circuit comprising only a part of said reactive elements of said series-tuned circuit as a terminal mid-series element thereof, the reactive constants of said filters being proportioned relative to the constants of said tuned circuit and the operating frequency range, so that uniform admittance is maintained through said tuned circuit and said second filter over said range.

14. A signal-translating system for operation over a wide range of frequencies comprising a vacuum-tube amplifier having inherent output capacitance, a uniform impedance transmission line and a series-resonant output circuit including series resistance, said capacitance and the elements of said series-resonant circuit tending to limit the response of said system over said range, a dead-end filter coupled between the output circuit of said amplifier and one end of said transmission line and comprising said capacitance as a full-shunt element of said filter, an impedance termination coupled to the dead end of said filter proportioned substantially to match the image impedance of said filter over said range, a second filter coupled between the other end of said transmission line and said series-tuned circuit comprising only a part of the reactive elements of said series-tuned circuit as a terminal mid-series element thereof, the reactive constants of said filters being proportioned relative to the constants of said tuned circuit and the operating frequency range so that uniform admittance is maintained through said tuned circuit and said second filter over said range.

15. A signal-translating system for operation over a wide range of frequencies comprising a first terminal circuit having inherent shunt capacitance, a uniform impedance transmission line and a series-resonant terminal circuit, said capacitance and the elements of said series-resonant circuit tending to limit the response of said system over said range, a dead-end filter coupled between said first terminal circuit and one end of said transmission line and comprising said capacitance as a full-shunt element of said filter, and an impedance termination coupled to the dead end of said filter proportioned substantially to match the image impedance of said filter over said range, a second filter coupled to the other end of said transmission line and said series-tuned circuit comprising only a part of the reactive elements of said series-tuned circuit as a terminal mid-series element thereof, the reactive constants of said filters being proportioned relative to the constants of said tuned circuit and the operating frequency range so that the response of one of said filters is complementary to that of the other over said range and a uniform response is maintained through said system over said range.

16. A signal-translating system for operation over a wide range of frequencies comprising two or more component networks coupled in cascade, each of said networks comprising a pair of terminals across which there is effectively substantial capacitance tending to limit the response of said system over said range, a dead-end filter for each of said networks having a predetermined image impedance over said range and coupled to the respective pairs of terminals, said filters having the same cutoff frequencies and each comprising only a part of the capacitance across which the filter is coupled as a terminal mid-shunt element of the filter, and an impedance termination coupled to the dead end of each filter proportioned substantially to match the image impedance of the filter over said range, the reactive constants of said filter being so proportioned relative to said capacitances and the operating frequency that the mean value of impedance across each of said pairs of terminals is substantially the maximum that can be maintained across said terminals over said range, said impedances across said terminals varying in a complementary manner over said range to produce a substantially uniform response in said system over said range.

17. A signal-translating system for operation over a wide range of frequencies comprising a pair of terminals across which there is effectively capacitance and conductance, said capacitance and conductance tending to limit the response of said system of said range, a dead-end filter having a predetermined image impedance coupled to said pair of terminals, said filter comprising only a part of the capacitance of said pair of terminals as a terminal mid-shunt element of said filter, and an impedance termination coupled to the dead-end of said filter proportioned substantially to match the image impedance of said filter over said range, the reactive constants of said filter being proportioned in accordance with the expression $$n^2 - n' = 1$$

where the parameters have a significance given in the specification.

HAROLD A. WHEELER.

Certificate of Correction

Patent No. 2,167,134.            July 25, 1939.

HAROLD A. WHEELER

It is hereby certified that errors appear in the printed specification of the above numbered patent requiring correction as follows: Page 3, second column, line 38, for "$Z/_o$" read $Z/R_o$; line 43, for "$b=\pi 2$" read $b=\pi/2$; line 55, for "$+1$" read $\pm 1$; page 4, first column, line 2, for "$\pi 2$" read $\pi/2$; and second column, line 32, Equation 28, for "$n'$" read $n'$; page 5, second column, lines 41 and 44, Equation 37, for "$R_{owc}$" read $R_o \omega_o$; page 7, first column, line 59, for "of" read or; page 9, first column, lines 35 and 39, for "$R^o$" read $R_o$; and that the said Letters Patent should be read with these corrections therein that the same may conform to the record of the case in the Patent Office.

Signed and sealed this 10th day of October, A. D. 1939.

[SEAL]

HENRY VAN ARSDALE,
*Acting Commissioner of Patents.* substantially the maximum that can be maintained across said terminals over said range, said impedances across said terminals varying in a complementary manner over said range to produce a substantially uniform response in said system over said range.

17. A signal-translating system for operation over a wide range of frequencies comprising a pair of terminals across which there is effectively capacitance and conductance, said capacitance and conductance tending to limit the response of said system of said range, a dead-end filter having a predetermined image impedance coupled to said pair of terminals, said filter comprising only a part of the capacitance of said pair of terminals as a terminal mid-shunt element of said filter, and an impedance termination coupled to the dead-end of said filter proportioned substantially to match the image impedance of said filter over said range, the reactive constants of said filter being proportioned in accordance with the expression $$n^2 - n' = 1$$

where the parameters have a significance given in the specification.

HAROLD A. WHEELER.

Certificate of Correction

Patent No. 2,167,134. July 25, 1939.

HAROLD A. WHEELER

It is hereby certified that errors appear in the printed specification of the above numbered patent requiring correction as follows: Page 3, second column, line 38, for "$Z/_o$" read $Z/R_o$; line 43, for "$b=\pi 2$" read $b=\pi/2$; line 55, for "$+1$" read $\pm 1$; page 4, first column, line 2, for "$\pi 2$" read $\pi/2$; and second column, line 32, Equation 28, for "n'" read $n'$; page 5, second column, lines 41 and 44, Equation 37, for "$R_{owc}$" read $R_o\omega_o$; page 7, first column, line 59, for "of" read or; page 9, first column, lines 35 and 39, for "$R^o$" read $R_o$; and that the said Letters Patent should be read with these corrections therein that the same may conform to the record of the case in the Patent Office.

Signed and sealed this 10th day of October, A. D. 1939.

[SEAL]

HENRY VAN ARSDALE,
*Acting Commissioner of Patents.*